(12) United States Patent
Allebes et al.

(10) Patent No.: US 11,689,245 B2
(45) Date of Patent: Jun. 27, 2023

(54) ASYNCHRONOUS POLAR TRANSMITTER AND OPERATION METHOD THEREOF

(71) Applicant: Stichting IMEC Nederland, Eindhoven (NL)

(72) Inventors: Erwin Allebes, Sterksel (NL); Johan van den Heuvel, Geldrop (NL); Gaurav Singh, Eindhoven (NL)

(73) Assignee: Stichting IMEC Nederland, Eindhoven (NL)

( * ) Notice: Subject to any disclaimer, the term of this patent is extended or adjusted under 35 U.S.C. 154(b) by 0 days.

(21) Appl. No.: 17/518,873

(22) Filed: Nov. 4, 2021

(65) Prior Publication Data

US 2022/0140860 A1 May 5, 2022

(30) Foreign Application Priority Data

Nov. 5, 2020 (EP) .................................. 20205837

(51) Int. Cl.
*H04B 1/717* (2011.01)
*H04L 25/03* (2006.01)
*H04L 27/36* (2006.01)

(52) U.S. Cl.
CPC ..... *H04B 1/7172* (2013.01); *H04L 25/03853* (2013.01); *H04L 27/361* (2013.01)

(58) Field of Classification Search
CPC ............ H04B 1/7172; H04L 25/03853; H04L 27/361; H04L 25/03343; H04L 25/03834
See application file for complete search history.

(56) References Cited

U.S. PATENT DOCUMENTS

2008/0225935 A1 9/2008 Reddy
2010/0246716 A1 9/2010 Wang et al.
(Continued)

FOREIGN PATENT DOCUMENTS

| EP | 2 251 976 | 11/2010 | |
| EP | 2 733 846 | 5/2014 | |
| EP | 2733846 A1 * | 5/2014 | ............ H03F 3/217 |

OTHER PUBLICATIONS

De Streel, "SleepTalker: A ULV 802.15.4a IR-UWB Transmitter SoC in 28-nm FDSOI Achieving 14 pJ/b at 27 Mb/s With Channel Selection Based on Adaptive FBB and Digitally Programmable Pulse Shaping", IEEE Journal of Solid-State Circuits, vol. 52, No. 4, Apr. 2017, pp. 1163-1177.
(Continued)

*Primary Examiner* — Sung S Ahn
(74) *Attorney, Agent, or Firm* — McDonnell Boehnen Hulbert & Berghoff LLP (57) ABSTRACT

A polar transmitter is provided. The polar transmitter includes a baseband generation unit configured to generate phase data bits and amplitude data bits of an output pulse. The polar transmitter further includes a bandwidth control unit downstream to the baseband generation unit configured to regulate the width of the output pulse. Moreover, the polar transmitter includes a pulse shaping unit downstream to the bandwidth control unit configured to generate a predefined amplitude envelope of the output pulse. In this context, the pulse shaping unit includes a delay-line with a plurality of taps, where each tap output is configured to be amplitude weighted in order to generate the amplitude envelope of the output pulse.

20 Claims, 11 Drawing Sheets

(56) References Cited

U.S. PATENT DOCUMENTS

2012/0056676 A1* 3/2012 Frambach ............. H03F 3/2178
330/295
2019/0199567 A1* 6/2019 Boehnke ........... H04L 27/26414

OTHER PUBLICATIONS

Extended European Search Report dated May 3, 2021 for European Application No. 20205837.6, 7 pages.

* cited by examiner

ASYNCHRONOUS POLAR TRANSMITTER AND OPERATION METHOD THEREOF

CROSS-REFERENCE TO RELATED APPLICATIONS

The present application is a non-provisional patent application claiming priority to European Patent Application No. 20205837.6, filed on Nov. 5, 2020, the contents of which are hereby incorporated by reference.

FIELD OF THE DISCLOSURE

The disclosure relates to transmitter design for impulse radios (IR), especially as used in ultra-wideband impulse radio (UWB-IR) design.

BACKGROUND

Impulse radios are popular for communication as well as for localization applications. Generally, the impulse radios employ a train of pulses with a given pulse repetition frequency (PRF) in order to determine the range or distance between two radios using measurement of time-of-flight. Similar techniques have also been employed for conventional passive ranging or radar applications, where an impulse radio is used to sense its surroundings by measuring the time-of-flight of the pulses reflected back from surrounding objects.

In order to do so, impulse radios involve amplitude modulation of RF carrier with a short time-domain pulse. However, the impulse radios are usually operable with low power consumption while complying with strict spectral masks requirements. The requirements may correspond to the spectral mask specifications for the major regional regulations as well as to the pulse shape requirements according to IEEE 802.15.4a and 802.15.4z standards.

For example, the document G. de Streel et al., "Sleep-Talker: A ULV 802.15.4a IR-UWB Transmitter SoC in 28 nm FDSOI Achieving 14 pJ/b at 27 Mb/s With Channel Selection Based on Adaptive FBB and Digitally Programmable Pulse Shaping", IEEE Journal of Solid-State Circuits, Vol. 52, No. 4, pp. 1163-1177, 2017 discloses a polar transmitter with synchronous RF pulse-shaping. However, the polar transmitter employs a high-frequency clock for timing of the pulse shaping RF-DAC (radio-frequency digital-to-analog converter). Therein, the pulse shaping is performed in amplitude domain only, which requires high-resolution DAC operating at 8-16 GHz. This high-frequency high-resolution DAC results in high power dissipation and further limits spectrum performance.

SUMMARY

Accordingly, an object of the disclosure is to provide an asynchronous polar transmitter and an operation method for the same, which can alleviate the aforementioned limitations.

According to a first aspect of the disclosure, an asynchronous polar transmitter is provided. The polar transmitter comprises a baseband generation unit configured to generate phase data bits and amplitude data bits of an output pulse or pulses or chips to be transmitted. The polar transmitter further comprises a bandwidth control unit downstream to the baseband generation unit configured to regulate the width, i.e., bandwidth, of the output pulse. Moreover, the polar transmitter comprises a pulse shaping unit downstream to the bandwidth control unit configured to generate a predefined amplitude envelope of the output pulse.

In this context, the pulse shaping unit comprises a delay-line with a plurality of taps resulting a plurality of tap outputs, where each tap output is configured to be amplitude weighted in order to generate the amplitude envelope of the output pulse. Hence, the taps are in-between the delays or delay elements, and each introduces a specific amount of time delay at the respective tap output. The tap outputs are further manipulated with respective amplitude weights.

Therefore, the disclosure facilitates an asynchronous pulse shaping approach in order to reduce power dissipation of conventional baseband up-modulated techniques for impulse modulation. For example, the output RF pulse is shaped using a delay-line based filter, where the incoming rectangular pulse or pulses are passed through N delay taps. Additionally, each delay tap output is further amplitude weighted in order to generate the pulse to be transmitted. For example, the combination of time-weighting and amplitude weighting can effectively suppress the side-lobes in the output spectrum, which can minimize the level of potential spurious emission in adjacent channels.

For example, delays and/or amplitude weights of the plurality of taps of the delay-line are configured to be controlled individually or collectively or in groups. Therefore, the time-delay of the respective delay elements at their corresponding tap outputs are configurable, either individually or jointly, so that they are not tied to a fixed timing grid. Additionally, the amplitude weights at the tap outputs are configurable, either individually or jointly. This allows for a more efficient and flexible implementation of the polar transmitter.

For example, the polar transmitter further comprises a carrier signal generation unit configured to modulate a phase of a carrier signal by the phase data bits, thereby generating a phase modulated carrier signal. Additionally, the polar transmitter comprises an amplification unit configured to modulate the amplitude envelope of the output pulse by the phase modulated carrier signal.

For example, the pulse shaping unit is further configured to control the delay and amplitude weighting at each tap output of the delay-line with respect to a predefined delay time and/or a predefined amplitude. For example, the pulse shaping unit is configured to control the delay and amplitude weighting at each tap output of the delay-line by a white noise and/or a spectrally shaped dithering signal. Therefore, the delay and amplitude weighting control can be toggled by using white or spectrally shaped dithering signal, which can suppress the side-lobes further.

For example, the pulse shaping unit is further configured to control the delay and amplitude weighting at each tap output of the delay-line with respect to a predefined pulse shape. In this regard, the predefined pulse shape can be randomly selected from a set of suitable pulse shapes. This typically results in lower side-lobes as each selected pulse shape has a different spectral output.

For example, the pulse shaping unit is further configured to control the delay and amplitude weighting at each tap output of the delay-line with respect to a sequence of data bits to be transmitted. In addition, the bandwidth control unit is further configured to regulate the width of the output pulse with respect to the sequence of data bits to be transmitted. For instance, for pulse sequences of equal polarity, the pulse bandwidth is reduced such that complete overlap occurs. For pulses with alternating polarity, the pulse bandwidth is increased in order to prevent any amplitude overlap, i.e. inter-symbol interference (ISI).

According to a second aspect of the disclosure, a method for operating an asynchronous polar transmitter is provided. The method comprises the step of generating, by a baseband generation unit, phase data bits and amplitude data bits of an output pulse. The method further comprises the step of regulating, by a bandwidth control unit downstream to the baseband generation unit, the width of the output pulse. Moreover, the method comprises the step of generating, by a pulse shaping unit downstream to the baseband generation unit, a predefined amplitude envelope of the output pulse.

In this context, the pulse shaping unit comprises a delay-line with a plurality of taps, where each tap output is configured to be amplitude weighted in order to generate the amplitude envelope of the output pulse. Therefore, the combination of time-weighting and amplitude weighting can suppress the side-lobes in the output spectrum.

For example, the method further comprises the step of controlling delays and/or amplitude weights of the plurality of taps of the delay-line individually or collectively or in groups. For example, a more efficient and flexible implementation of the polar transmitter is incorporated.

For example, the method further comprises the step of controlling the delay and amplitude weighting at each tap output of the delay-line with respect to a predefined delay time and/or a predefined amplitude. Additionally, the method further comprises the step of controlling the delay and amplitude weighting at each tap output of the delay-line by a white noise and/or a spectrally shaped dithering signal. For example, the side-lobes in the output spectrum can be further suppressed by using white or dithering signal and by toggling the delay and amplitude weighting accordingly.

For example, the method further comprises the step of controlling the delay and amplitude weighting at each tap output of the delay-line with respect to a predefined pulse shape, for example corresponding to a randomly selected pulse shape from a set of suitable pulse shapes. This can result in lower side-lobes as each selected pulse shape has a different spectral output. Additionally or alternatively, the method further comprises the step of controlling the delay and amplitude weighting at each tap output of the delay-line with respect to a sequence of data bits to be transmitted.

BRIEF DESCRIPTION OF THE FIGURES

The above, as well as additional, features will be better understood through the following illustrative and non-limiting detailed description of example embodiments, with reference to the appended drawings.

All the figures are schematic, not necessarily to scale, and generally only show parts which are necessary to elucidate example embodiments, wherein other parts may be omitted or merely suggested.

DETAILED DESCRIPTION

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example. Furthermore, like numbers refer to the same or similar elements or components throughout.

Figure 1:
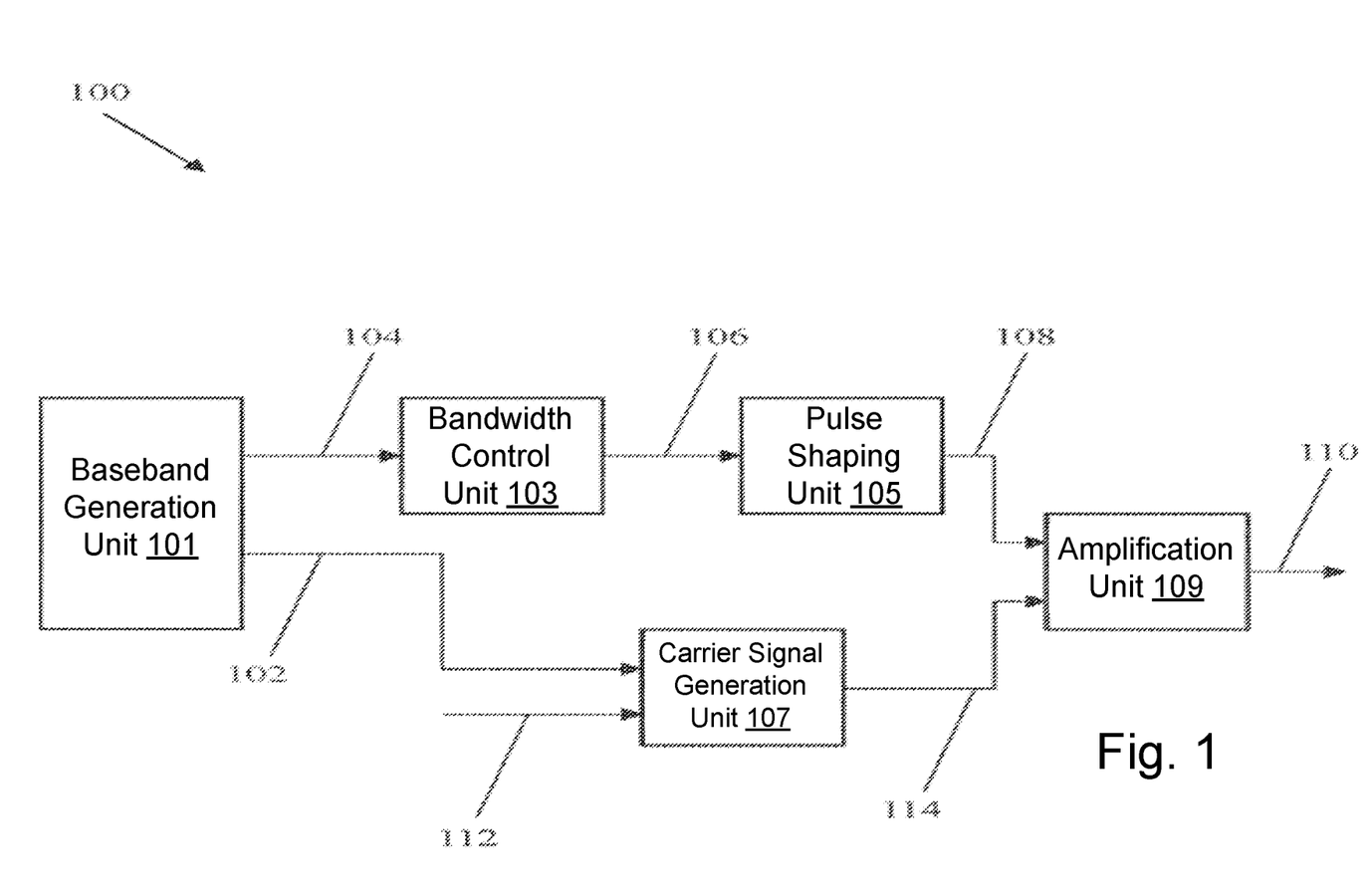
FIG. 1 is a block diagram of an asynchronous polar transmitter, according to an example.

In FIG. 1, an embodiment of the polar transmitter 100 according to the first aspect of the disclosure is illustrated. The polar transmitter 100 comprises a baseband generation unit or digital baseband 101 that generates phase data bits 102 and amplitude data bits 104 of an output pulse 110 to be transmitted by the polar transmitter 100. Along the amplitude path 104, a bandwidth control unit 103 is provided that regulates the width of the output pulse 110. The output 106 of the bandwidth control unit 103 is fed to a pulse shaping unit that generates a predefined amplitude envelope 108 of the output pulse 110.

Furthermore, along the phase path 102, a carrier signal generation unit 107 is provided that modulates a phase of a carrier signal 112 by the phase data bits 102, thereby generating a phase modulated carrier signal 114. The polar transmitter 100 further comprises an amplification unit 109 that modulates the amplitude envelope 108 of the output pulse by the phase modulated carrier signal 114.

Figure 2:
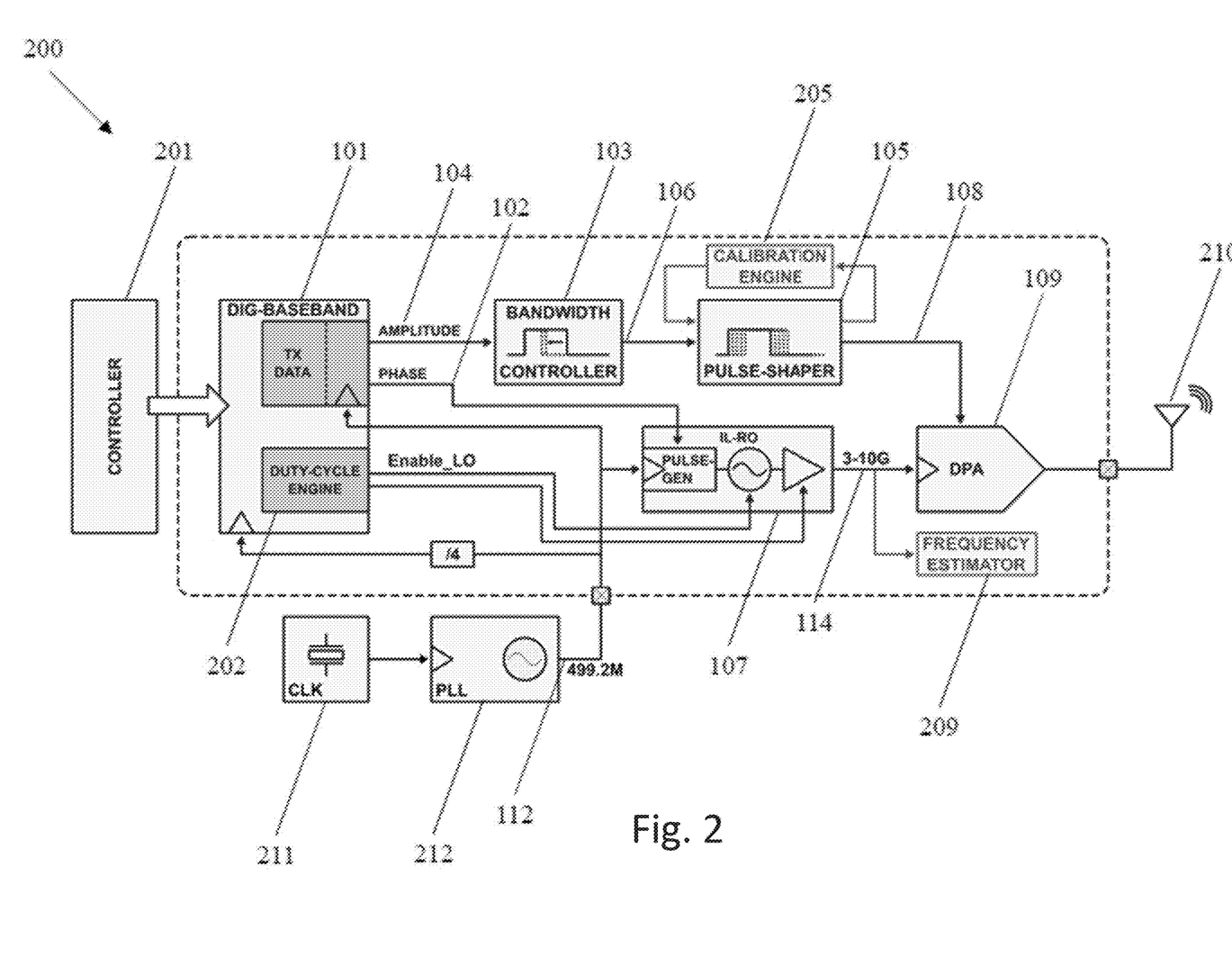
FIG. 2 is a more detailed block diagram of the asynchronous polar transmitter of FIG. 1, according to an example.

In FIG. 2, the polar transmitter 100 of FIG. 1 is illustrated in detail. The polar transmitter 200 of FIG. 2 further includes signaling lines and operation frequencies. A controller 201 is provided that operates on the baseband generation unit 101 in order to generate the data bits of the output pulse or pulses or chips for a given modulation. For instance, in case of a BPSK modulation, the baseband generating unit 101 may output 2-bit ternary code representing phase and amplitude of the chips to be transmitted. The chips generation rate correspond to the reference clock frequency, which is generated from a phase locked loop 212 operating at a given oscillator clock 211.

In this example, the clock rate 112 is shown as 499.2 MHz. Therefore, the baseband generating unit 101 may generate the 2-bit ternary code, i.e. a phase data bit and an amplitude data bit, at 499.2 MHz. The phase data or select bit 102 modulates the phase of the RF carrier in the carrier signal generation unit 107. The carrier signal generation unit 107 can be realized, for instance, by an injection locked ring oscillator that supports a wide operation frequency range. The injection locking is typically performed via feed-forward phase locking technique that eliminates the necessity for a phase locked loop. In addition, the baseband generating unit 101 provides an option to duty cycle the carrier signal generating unit 107, for example the injection locked ring oscillator within, by a duty cycle engine 202, typically over a single chip period. This typically improves the efficiency of the transmitter in terms of energy consumption.

On the amplitude path 104, the rectangular pulse from the baseband generation unit 101 is fed to the bandwidth control unit 103 that tunes the pulse width. In this example, the baseband generation unit 101 feeds the rectangular pulse with a 2 nm width to the bandwidth control unit 103, which may tune the pulse width accordingly. This pulse is applied to the pulse shaping unit 105 that generates the desired amplitude envelope, which is modulated by the RF carrier 114 in the amplification unit 109. The modulated output is then transmitted through an antenna 210.

The pulse shaping unit 105, which will be described in detail in the later sections, may additionally comprise an on-chip calibration engine 205 in order to calibrate the pulse shaping unit 105 when the transmitter 200 is inactive. Furthermore, the amplification unit 109 may comprise a digital power amplifier, for instance a class-D digital power amplifier. The transmitter 200 may additionally comprise a frequency estimator 209 in order to estimate an operating frequency at the amplification unit 109.

Figure 3:
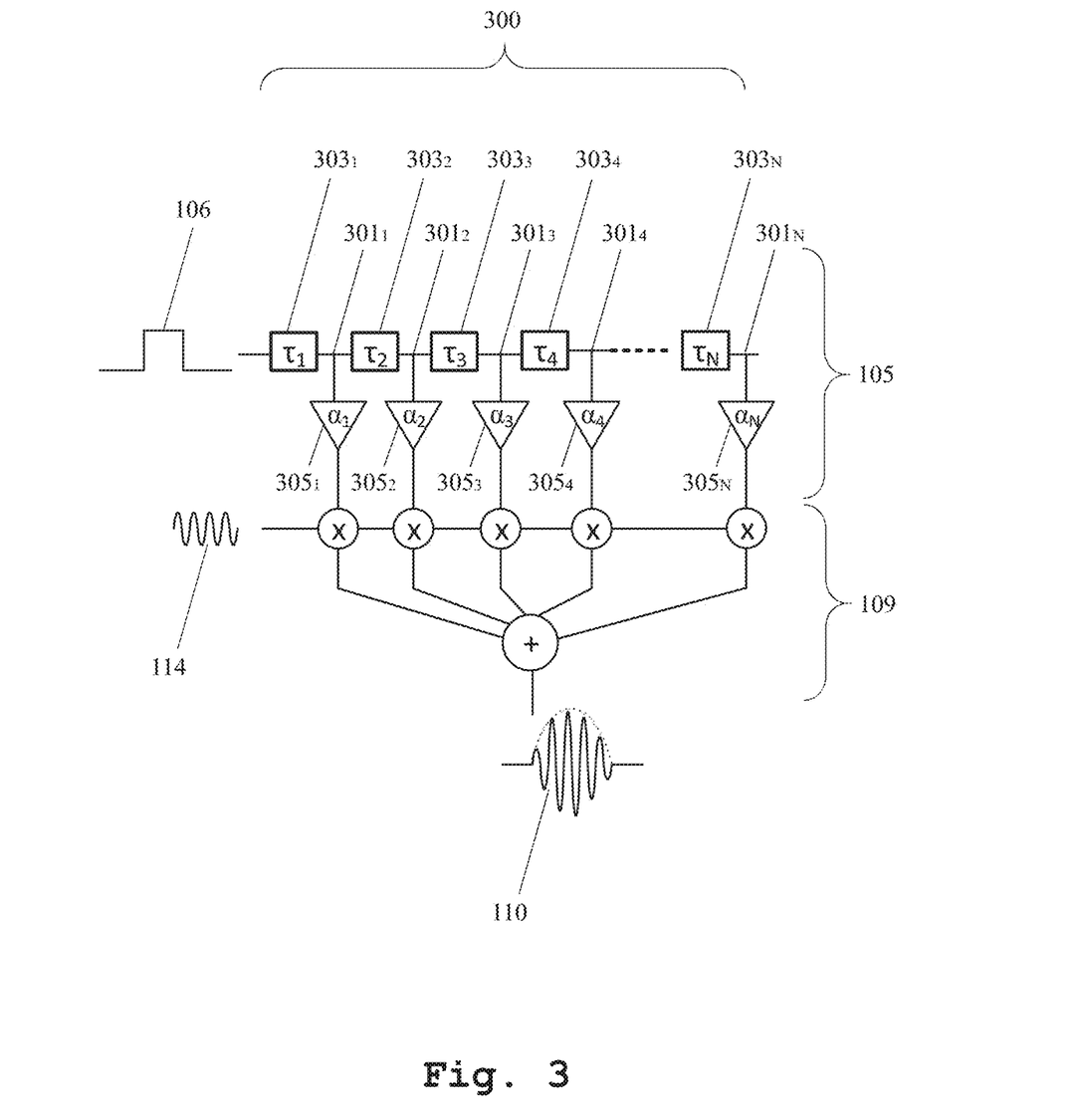
FIG. 3 shows a pulse shaping technique, according to an example.

In FIG. 3, a first embodiment of the inventive pulse shaping technique according to the first aspect of the disclosure is illustrated. More particularly, FIG. 3 shows a delay-line based filter 300 that is incorporated with the pulse shaping unit 105. The delay-line based filter or the delay-line 300 comprises N delay taps $301_1, 301_2, 301_3, \ldots, 301_N$ each corresponding to a respective time delay of a respective delay element $303_1, 303_2, 303_3, \ldots, 303_N$. In other words, each delay tap provides a tap output corresponding to a cumulative time delay $\tau_1, \tau_2, \tau_3, \tau_4, \ldots, \tau_N$ of a preceding number of the delay elements $301_1, 301_2, 301_3, \ldots, 301_N$, respectively.

In addition, the tap outputs at the N delay taps $301_1, 301_2, 301_3, \ldots, 301_N$ are further amplitude weighted by means of respective amplitude weights $305_1, 305_2, 305_3, \ldots, 305_N$ at each tap output with a gain $\alpha_1, \alpha_2, \alpha_3, \alpha_4, \ldots, \alpha_N$, respectively. For instance, the gain values $\alpha_1, \alpha_2, \alpha_3, \alpha_4, \ldots, \alpha_N$ may correspond to a multiplier, either a whole or a fraction number, on the amplitude of the rectangular pulse, e.g. respective to each delayed version of the rectangular pulse. In particular, the delay $\tau_1, \tau_2, \tau_3, \tau_4, \ldots, \tau_N$ and the amplitude weights $\alpha_1, \alpha_2, \alpha_3, \alpha_4, \ldots, \alpha_N$ are fully configurable either individually (per pulse) or in groups (per burst).

The pulse shaping unit 105 therefore operates asynchronously in order to shape the rectangular pulse output 106 coming from the bandwidth control unit 103. The delay elements $303_1, 303_2, 303_3, \ldots, 303_N$ can be implemented as analog delay elements, for instance by using current-starved buffers whose unit delay $\tau$ is programmable by a 4-bit current bias. In this case, the calibration engine 205 plays a role in order to take into account for PVT variations and performs on-chip calibration when the transmitter is inactive. In this regard, the output of the delay-line 300 is fed back to its input converting it into a ring oscillator. The calibration engine 205 may further comprise a frequency measurement unit in order to measure and calibrate the unit delay $\tau$, thereby improving the current bias setting.

The delayed and additionally amplitude weighted versions of the rectangular pulses are summed in the amplification unit 109, which results in the amplitude envelope. The RF carrier 114 in the amplification unit 109 modulates the amplitude envelope, thereby generating the output pulses 110.

Figure 4A:
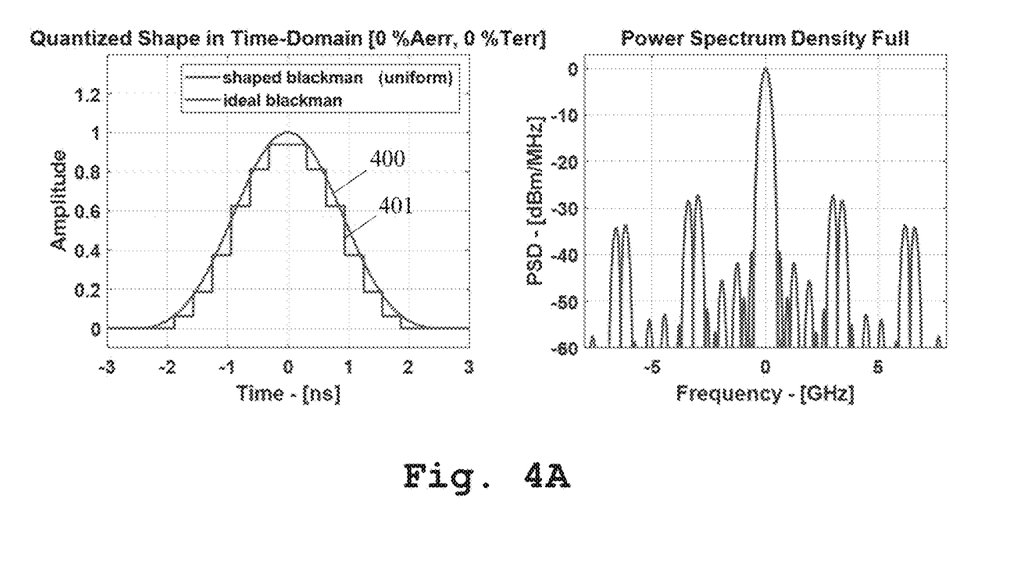
FIG. 4A shows a conventional pulse shaping technique for uniform time steps and its resulting spectrum, according to an example.
Figure 4B:
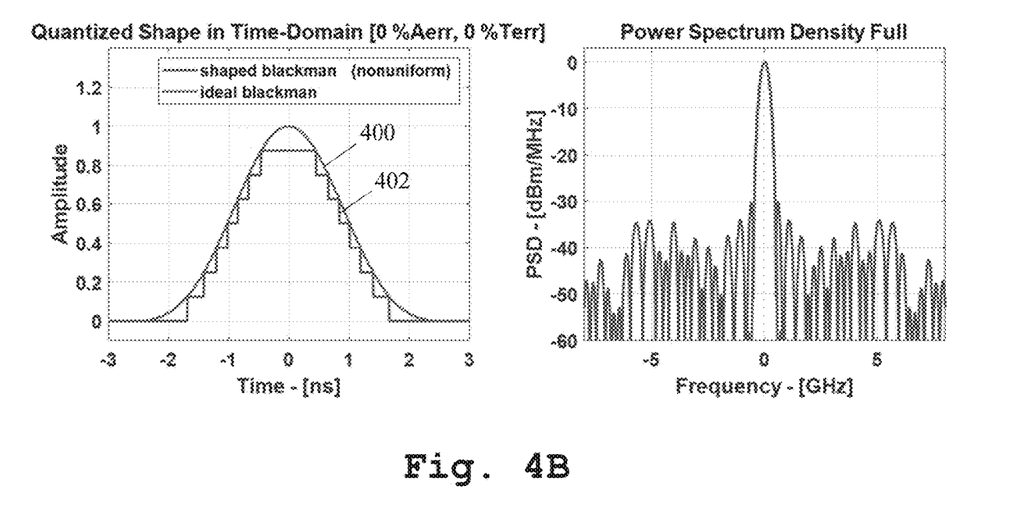
FIG. 4B shows a pulse shaping technique for uniform amplitude steps and its resulting spectrum, according to an example.

In FIG. 4A and FIG. 4B, pulse shaping techniques and their respective spectrum are illustrated. In particular, FIG. 4A shows conventional pulse shaping technique for uniform time steps and its resulting spectrum. The power spectral density as shown corresponds to an emulated Blackman window, where the function is emulated uniformly, i.e. with constant time-delays but with custom amplitude weighting. The function is shown in the time domain on left, where the line 400 corresponds to an ideal Blackman window and the line 401 corresponds to the uniformly emulated Blackman window. The horizontal axis represents time in nanoseconds and the vertical axis represents amplitude, e.g. in volts.

It can be seen that the time steps are kept constant in line 401, however, the steps are weighted with different amplitude. On the right, the power spectral density is shown for the uniformly emulated Blackman window in frequency domain. Here, the horizontal axis represents frequency in Gigahertz and the vertical axis represents power spectral density in dBm/MHz.

On the other hand, FIG. 4B shows a pulse shaping technique for uniform amplitude steps and its resulting spectrum. The power spectral density as shown corresponds to an emulated Blackman window, where the function is emulated non-uniformly, i.e. with constant amplitude weights but with custom time-delays. The function is shown in the time domain on left, where the line 400 corresponds to an ideal Blackman window and the line 402 corresponds to the non-uniformly emulated Blackman window. The horizontal axis represents time in nanoseconds and the vertical axis represents amplitude, e.g. in volts.

It can be seen that the amplitudes for the steps are kept constant in line 402, however, the steps are delayed with different time-delays. For instance, this can be achieved by keeping the gain values $\alpha_1, \alpha_2, \alpha_3, \alpha_4, \ldots, \alpha_N$ of the delay-line 300 constant while the time-delays $\tau_1, \tau_2, \tau_3, \tau_4, \ldots, \tau_N$ are chosen to emulate the window non-uniformly. On the right, the power spectral density is shown for the non-uniformly emulated Blackman window in frequency domain. Here, the horizontal axis represents frequency in Gigahertz and the vertical axis represents power spectral density in dBm/MHz. It can be seen that the spectrum improves significantly for the non-uniformly emulated Blackman window.

Figure 5:
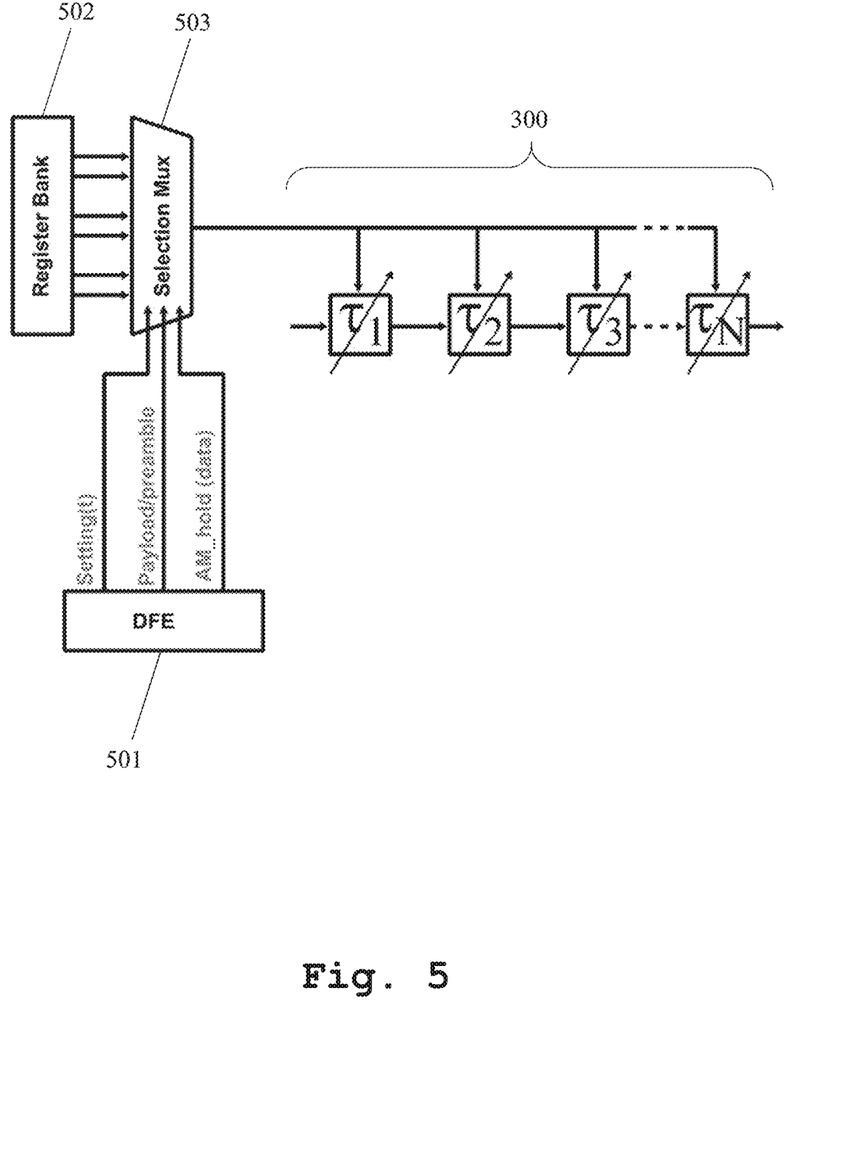
FIG. 5 shows a pulse shaping technique, according to an example.

In FIG. 5, a second embodiment of the inventive pulse shaping technique according to the first aspect of the disclosure is illustrated. The technique illustrated herein is an extension of the pulse shaping technique of FIG. 3.

The delay-line 300 is further enhanced by incorporating a register bank 502, which may store specific settings for the time-delays $\tau_1, \tau_2, \tau_3, \tau_4, \ldots, \tau_N$ and/or the amplitude weights $\alpha_1, \alpha_2, \alpha_3, \alpha_4, \ldots, \alpha_N$. Any given combination of such settings can be preloaded at the register bank and can be implemented on the delay-line 300 in order to generate a defined amplitude envelope. A selection multiplexer or MUX 503 generally preloads the settings from the register bank 502 and/or switch between different settings based on the settings provided by the digital front-end (DFE) or digital baseband 501, which may correspond to the baseband generating unit 101.

For instance, the time-delays $\tau_1, \tau_2, \tau_3, \tau_4, \ldots, \tau_N$ and the amplitude weights $\alpha_1, \alpha_2, \alpha_3, \alpha_4, \ldots, \alpha_N$ can be toggled, for example by the settings provided by the DFE 501 through the selection MUX 503, where the control may be toggled by use of white or spectrally shaped dithering signal.

This further suppress the side-lobes. Moreover, the proposed technique facilitates another possibility to randomly select a pulse shape from a set of suitable pulse shapes. The selection can occur per pulse or per burst.

In other words, the DFE 501 may apply, based on the data to be transmitted, additional techniques, e.g. dithering. The DFE 501 may apply this dithering technique based on packet data (preamble/payload and AM_hold), but also from more general settings (setting(t)). Such settings can be random signal changing pulse shape settings at arbitrary intervals by selecting different pulse shape settings from the register bank 502. This results in lower side-lobes as each selected pulse shape has a different spectral output.

Figure 6:
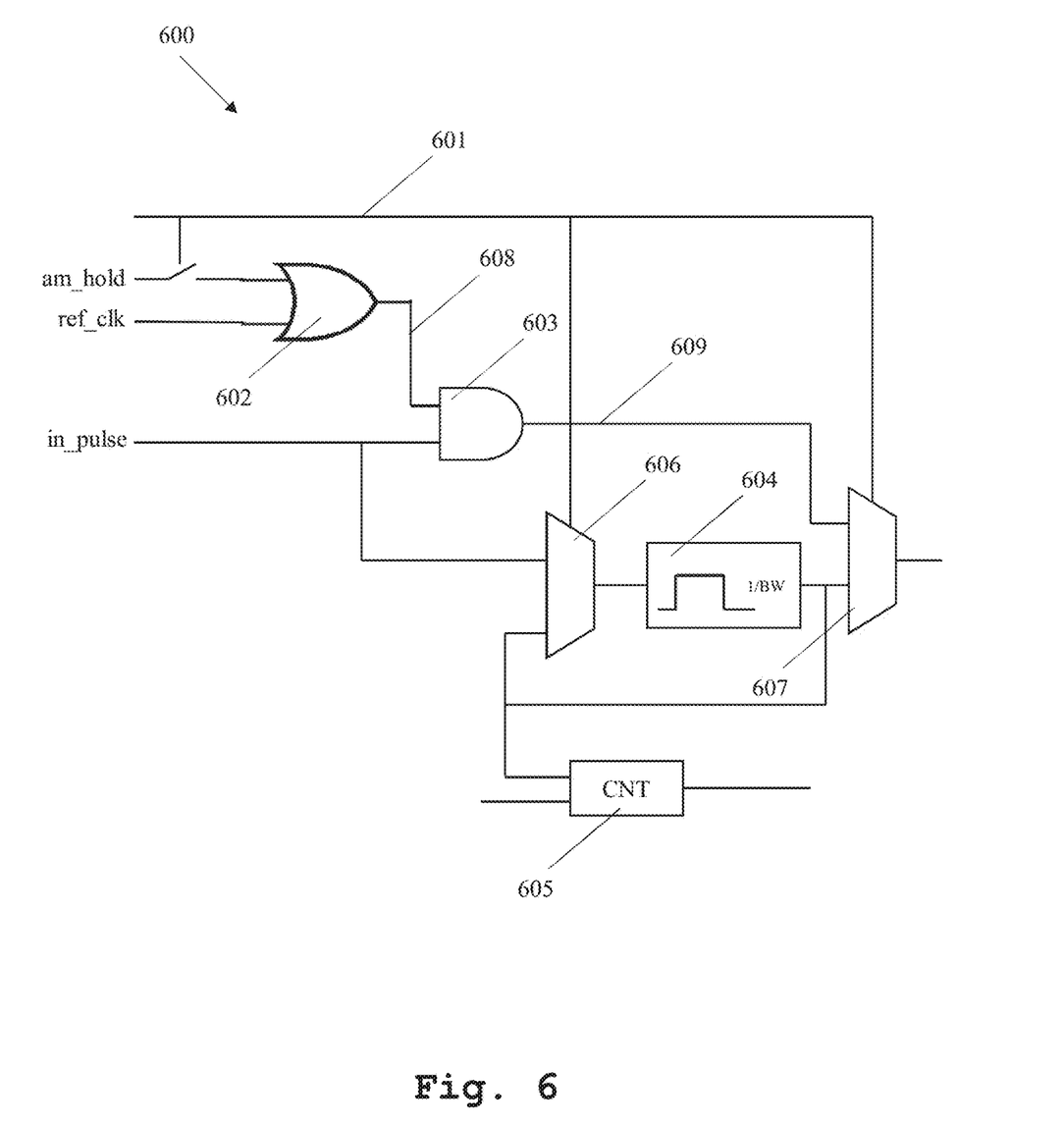
FIG. 6 shows a bandwidth controller, according to an example.

In FIG. 6, an embodiment of the bandwidth controller 600 according to the first aspect of the disclosure is illustrated. The bandwidth controller 600 facilitates data-dependent pulse shaping by controlling the width and/or the shape of the pulse based on the sequence of data bits to be transmitted. In this regard, a control line 601 is provided in order to control the logic blocks 602, 603 so that the amplitude can be held constant over the periods of clock pulses based on the bit sequences of the input pulse. The period over which the rectangular pulses are held constant is estimated in a bandwidth estimation block 604 and feeds back the information to a counter 605 that counts the respective time-delays.

In particular, the logic blocks are implemented with an OR logic gate 602 and an AND logic gate 603. The inputs of the OR logic gate 602 correspond to an amplitude hold signal and the reference clock pulses, where the amplitude hold signal is coupled in a switchable manner. The control line 601 controls the operation of the OR logic gate 602 such that for specific periods of the reference clock, the amplitude hold signal is switched onto the input of the OR logic gate 602. Therefore, the OR logic gate 602 generates pulses when either one or both inputs are 1.

The output 608 of the OR logic gate 602 is further provided to the AND logic gate 603 along with the magnitude of the input pulses. The results in the AND logic gate 603 generating pulses only when the output 608 of the OR logic gate 602 and the input pulse are both 1. This output 609 can correspond to the output of the bandwidth controller 600 of which the pulse widths are further modulated by the bandwidth estimation block 604.

For example, the bandwidth estimation block 604 comprises a first stage multiplexing 606 and a second stage multiplexing 607, where the first stage multiplexing 606 couples in the input pulses i.e. data pulses along with a feedback from the bandwidth estimation block 604. The second stage multiplexing 607 outputs the modulated pulses based on the output 609 of the AND logic gate 603. The first stage multiplexing 606 and the second stage multiplexing 607 both are controlled by the control line 601.

Figure 7A:
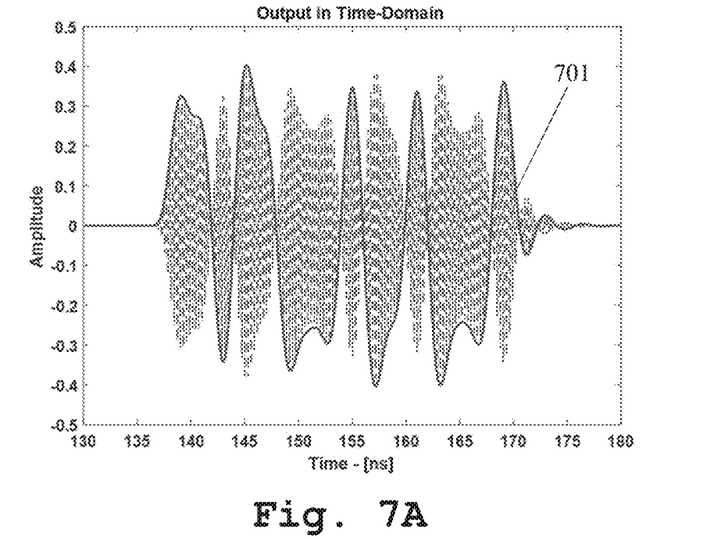
FIG. 7A shows pulses with a baseband envelope where conventional pulse shaping is performed at baseband, according to an example.
Figure 7B:
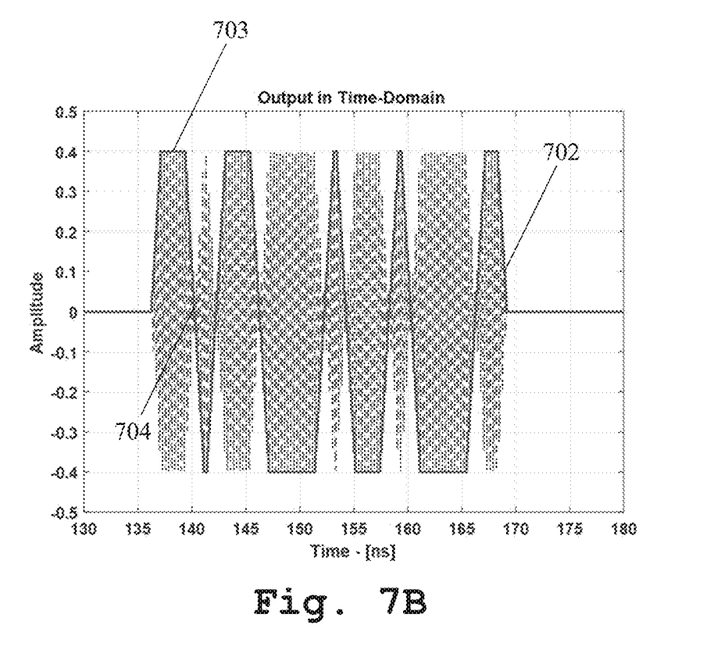
FIG. 7B shows mimicked pulses for the data of FIG. 7A with data dependent pulse shaping, according to an example.

In FIG. 7A and FIG. 7B, pulses according to baseband pulse shaping and data dependent pulse shaping are shown. FIG. 7A shows pulses with baseband envelope 701 where the pulse shaping is performed at baseband with $5^{th}$ order Butterworth LPF and up-converted to RF. FIG. 7B shows how the filtered baseband pulses are mimicked in order to facilitate the data-dependent pulse shaping. The pulse output, i.e. the envelope 701 in FIG. 7A is shown in the time domain, where the horizontal axis represents time in nanoseconds and the vertical axis represents amplitude, e.g. in volts. For instance, a sequence of consecutive +1 s or −1 s in a BPSK modulator can result in a long pulse, while a transition of bits results in shortening of the pulse width. This can be achieved by dynamically changing the pulse bandwidth based on the data sequence.

Therefore, according to the proposed data-dependent pulse shaping, the pulse-bandwidth is reduced for pulse sequences of equal polarity such that complete overlap occurs and as a result the pulse amplitude is held constant. However, for pulses with alternating polarity, the pulse bandwidth is increased to prevent inter-symbol interference (ISI). This technique can allow the transmitter to generate the desired waveform without requiring any advanced algorithms to be implemented for I-Q to polar conversion.

This can be seen in FIG. 7B where the mimicked baseband pulses are shown in the time domain, where the horizontal axis represents time in nanoseconds and the vertical axis represents amplitude, e.g. in volts. The pulse width is a function of the number of consecutive data bits represents as pulse with phase −1 or +1 (e.g. a sequence +1, +1, −1, +1, +1, −1, −1, −1, +1, −1, −1, +1, −1, −1, −1, +1). When two or more sequence of −1 s or +1 s is to be transmitted, the pulse amplitude is held constant. For instance, for the envelope 702, the edges 703 are the result of the constant pulse amplitude. It can be further seen that the phases are always changed at zero-crossings 704.

Figure 8:
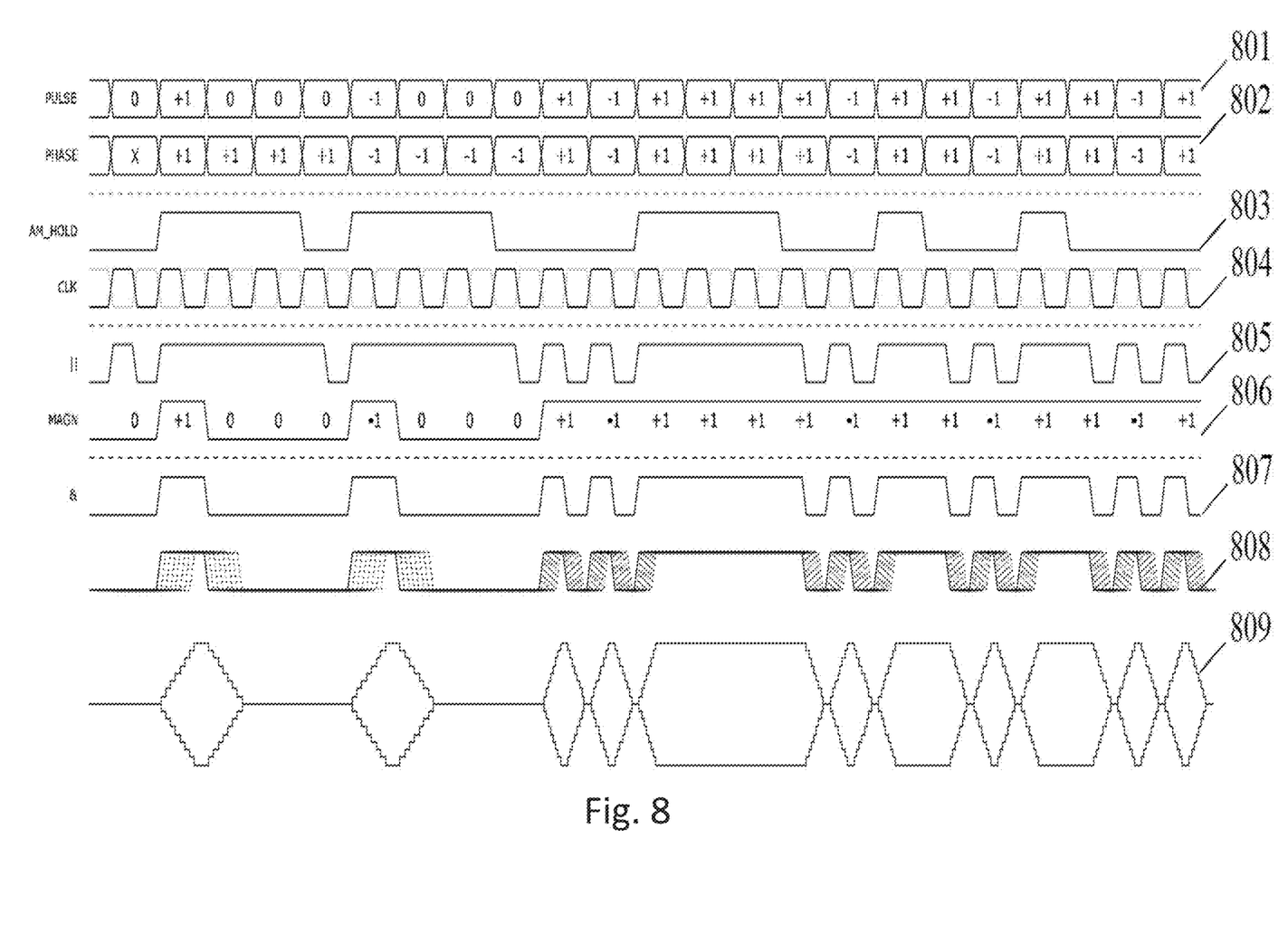
FIG. 8 shows timing operations for a data dependent pulse shaping, according to an example.

In FIG. 8, timing operations for the above-mentioned data dependent pulse shaping are illustrated. The signal 801 represents the pulse bits in a consecutive sequence and the signal 802 represents the phases of the pulse bits 801. The signal 803 represents a control signal for holding the amplitude constant as described above. It can be seen that the amplitude is held constant when two or more sequence of −1 s or +1 s is to be transmitted. The signal 804 represents a clock signal, for instance at or around a frequency of 500 MHz.

The signal 805 results from the amplitude hold signal 803 and the clock signal 804, for instance the output 608 at the logic block of the bandwidth controller 600 and along with the magnitude 806 of the bits to be transmitted, the pulse widths of the pulses 807 to be transmitted are generated. Hence, the signal 807 corresponds to the output 609 of the bandwidth controller 600, for instance. The signal 808 represents the delayed and/or amplitude weighted pulses, and hence corresponds to the output of the pulse shaping unit, for instance. Finally, the signal 809 represents the summed tap outputs from the tapped delay-line 300 e.g. the pulse shaping unit, thereby generating the amplitude envelope to be modulated by the carrier signal 114 at the amplification unit 109.

Figure 9A:
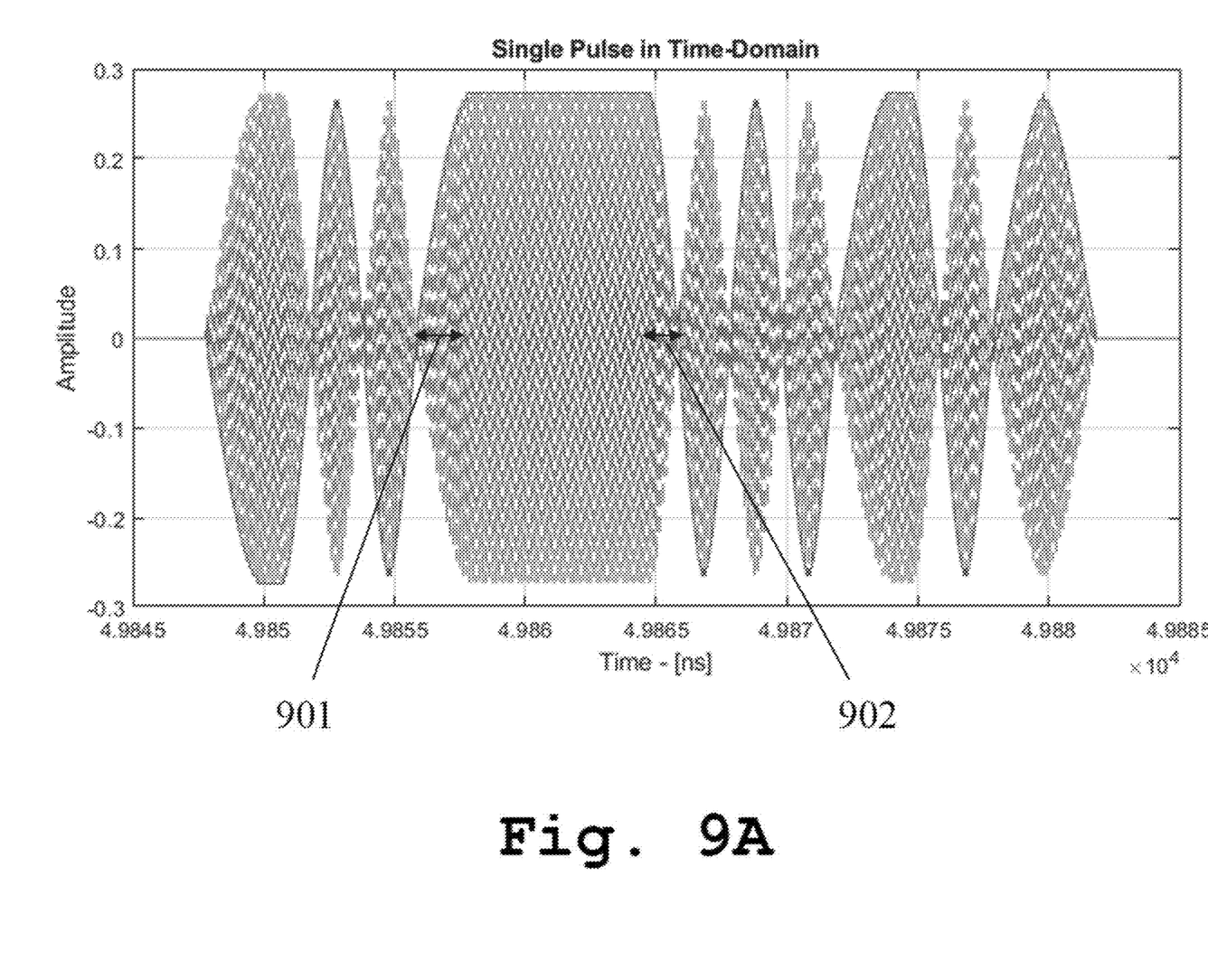
FIG. 9A shows baseband pulses in BPSK modulation with different rise and fall times for data dependent pulse shaping, according to an example.

In FIG. 9A, a further expansion of the proposed bit dependent pulse shaping technique is illustrated. FIG. 9A shows a single pulse in the time domain, where the horizontal axis represents time in nanoseconds and the vertical axis represents amplitude, e.g. in volts. Particularly, the proposed bit-dependent pulse shaping technique is extended, for example by elongating the rising edge of the first pulse and the falling edge of the last pulse of a burst. The different rise times and fall times can be seen in FIG. 9A, for instance the rise time 901 is noticeably different (e.g. longer) than the fall time 902 (e.g. shorter).

Figure 9B:
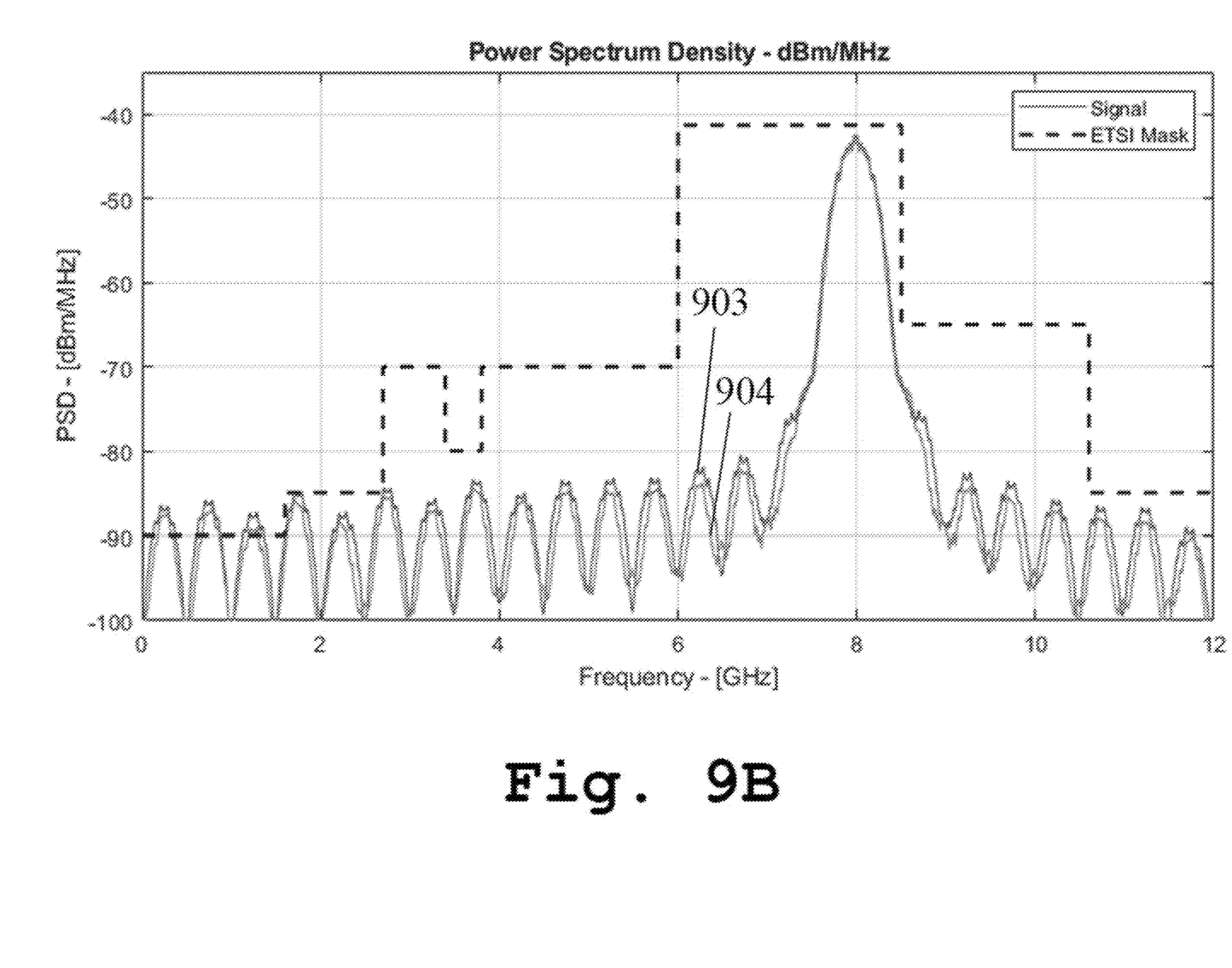
FIG. 9B shows a comparison of equal and data dependent rise and fall times in BPSK modulation with ETSI mask requirements, according to an example.

In FIG. 9B, the output spectrum of equal rise and fall time 903 is compared with the output spectrum with data-dependent rise and fall time 904 as described above. Further, the output spectrums are compared with the ETSI spectral mask (dashed lines). It can be seen that the power spectrum density for both techniques falls within the limits set by the ETSI mask, however, the data-dependent rise and fall time further improves the output spectrum in terms of side-lobes suppression.

Figure 10:
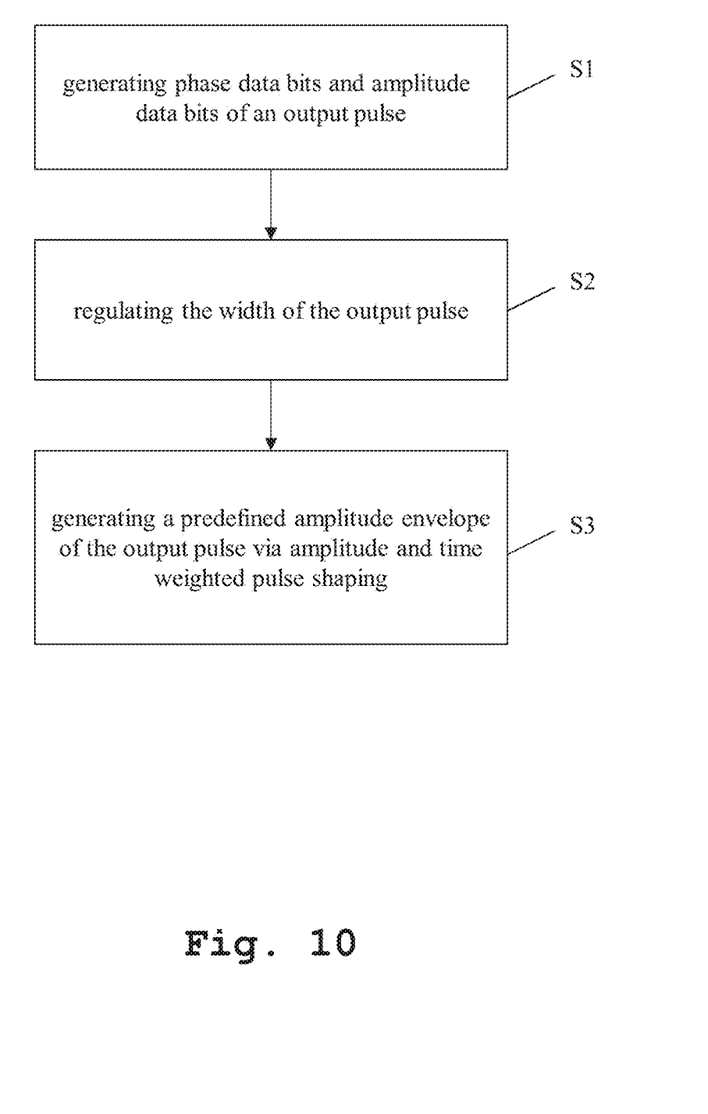
FIG. 10 is a block diagram of a method, according to an example.

In FIG. 10, an embodiment of the method according to the second aspect of the disclosure is illustrated. In a first step S1, phase data bits and amplitude data bits of an output pulse are generated. In a second step S2, the width of the output pulse is regulated. In a third step S3, a predefined amplitude envelope of the output pulse is generated via amplitude and time weighed pulse shaping.

The embodiments of the present disclosure can be implemented by hardware, software, or any combination thereof. Various embodiments of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

Although the disclosure has been illustrated and described with respect to one or more implementations, equivalent alterations and modifications will occur to others skilled in the art upon the reading and understanding of this specification and the annexed drawings. In addition, while a particular feature of the disclosure may have been disclosed with respect to only one of several implementations, such feature may be combined with one or more other features of the other implementations as may be desired and advantageous for any given or particular application.

While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

What is claimed is:

1. A polar transmitter comprising:
    a baseband generation unit configured to generate phase data bits and amplitude data bits of an output pulse,
    a bandwidth control unit downstream to the baseband generation unit configured to regulate a width of the output pulse, and
    a pulse shaping unit downstream to the bandwidth control unit configured to generate an amplitude envelope of the output pulse,
    wherein the pulse shaping unit comprises a delay-line with a plurality of taps, wherein each tap output of the plurality of taps is configured to be amplitude weighted to generate the amplitude envelope of the output pulse, and
    wherein the pulse shaping unit is further configured to control a delay and an amplitude weighting at each tap output of the plurality of taps based on the phase data bits and the amplitude data bits to be transmitted.

2. The polar transmitter according to claim 1, wherein delays of the plurality of taps are configured to be controlled individually.

3. The polar transmitter according to claim 1, wherein amplitude weights of the plurality of taps are configured to be controlled individually.

4. The polar transmitter according to claim 1, wherein delays of the plurality of taps are configured to be controlled collectively.

5. The polar transmitter according to claim 1, wherein amplitude weights of the plurality of taps are configured to be controlled collectively.

6. The polar transmitter according to claim 1, further comprising a carrier signal generation unit configured to modulate a phase of a carrier signal using the phase data bits, thereby generating a phase modulated carrier signal.

7. The polar transmitter according to claim 6, further comprising an amplification unit configured to modulate the amplitude envelope of the output pulse by the phase modulated carrier signal.

8. The polar transmitter according to claim 1, wherein the pulse shaping unit is further configured to control a delay and an amplitude weighting at each tap output of the delay-line with respect to a predefined delay time.

9. The polar transmitter according to claim 1, wherein the pulse shaping unit is further configured to control a delay and an amplitude weighting at each tap output of the delay-line with respect to a predefined amplitude.

10. The polar transmitter according to claim 1, wherein the pulse shaping unit is further configured to control a delay and an amplitude weighting at each tap output of the delay-line using a white noise signal.

11. The polar transmitter according to claim 1, wherein the pulse shaping unit is further configured to control a delay and an amplitude weighting at each tap output of the delay-line using a spectrally shaped dithering signal.

12. The polar transmitter according to claim 1, wherein the pulse shaping unit is further configured to control a delay and an amplitude weighting at each tap output of the delay-line with respect to a predefined pulse shape.

13. The polar transmitter according to claim 1, wherein the bandwidth control unit is further configured to regulate the width of the output pulse with respect to the phase data bits and the amplitude data bits to be transmitted.

14. A method for operating a polar transmitter, the method comprising:
    generating, by a baseband generation unit, phase data bits and amplitude data bits of an output pulse,
    regulating, by a bandwidth control unit downstream to the baseband generation unit, a width of the output pulse, and
    generating, by a pulse shaping unit downstream to the bandwidth control unit, an amplitude envelope of the output pulse,
    wherein the pulse shaping unit comprises a delay-line with a plurality of taps, wherein each tap output of the plurality of taps is amplitude weighted to generate the amplitude envelope of the output pulse, and
    wherein generating the amplitude envelope comprises controlling a delay and an amplitude weighting at each tap output of the plurality of taps based on the phase data bits and the amplitude data bits to be transmitted.

15. The method according to claim 14, further comprising controlling delays and/or amplitude weights of the plurality of taps of the delay-line individually or collectively or in groups.

16. The method according to claim 14, further comprising controlling the delay and amplitude weighting at each tap output of the delay-line with respect to a predefined delay time and/or a predefined amplitude.

17. The method according to claim 14, further comprising controlling the delay and amplitude weighting at each tap output of the delay-line by a white noise signal and/or a spectrally shaped dithering signal.

18. The method according to claim 14, further comprising controlling the delay and amplitude weighting at each tap output of the delay-line with respect to a predefined pulse shape.

19. The polar transmitter of claim 1, wherein the polar transmitter is further configured to sum the tap outputs of the plurality of taps to generate the amplitude envelope.

20. The method of claim 14, wherein generating the amplitude envelope comprises summing the tap outputs of the plurality of taps.

\* \* \* \* \*